July 17, 1951  N. S. SODDERS  2,561,036

THREAD CUTTING SHEET METAL NUT

Filed June 7, 1948

INVENTOR
Noel S. Sodders
BY Lawler + Lawler
Attys.

Patented July 17, 1951

2,561,036

UNITED STATES PATENT OFFICE 2,561,036

THREAD-CUTTING SHEET METAL NUT

Noel S. Sodders, Cleveland, Ohio

Application June 7, 1948, Serial No. 31,424

1 Claim. (Cl. 85—36)

The object of the invention is to provide a nut that eliminates the expense of cutting a thread on the plastic bolt and the inconvenience and annoyance of the nut not fitting the thread on the bolt if the bolt has been previously threaded.

Another object of the invention is the production of a nut which will permit a large manufacturing tolerance and at the same time produce a nut having an extremely high degree of usefulness.

Another object of considerable practical importance is that of the cutting angle of the thread cutting means in the nut, which is almost a negative cutting angle, the desired angle generally approved for the cutting of plastics.

Another object which differentiates the present invention from the art, is the fact that as the bolt is screwed home in the nut, and the nut is flattened out, the pitch and lead of the thread is partially changed, so that the advancing thread cut in the bolt is perceptibly deeper, leaving the thread behind the nut with a minor diameter (formerly known as "core diameter"), that is, the smallest diameter of the thread of the screw, greater than that of the advancing screw or thread. This is so because the plastic bolt is softer than the steel out of which the nut is made, and when in use the material being secured between the underside of the head of the bolt and the nut on being tightly compressed between the two, flattens out the nut, thus increasing the depth of the thread in the bolt and altering the pitch and lead of the screw thread. Because of this change in the screw formation on the bolt, the bolt is prevented from unscrewing in the nut, and the nut is prevented from backing off the bolt, after they have been caused to reach their tightening limits.

To elucidate terms relating to screw threads used in the specification, this concise summary is given:

*Screw thread.*—A ridge of uniform section in the form of a helix on the surface of a cylinder or cone.

*External and internal threads.*—An external thread is a thread on the outside of a member. Example: A threaded plug. An internal thread is a thread on the inside of a member. Example: A threaded hole.

*Major diameter (formerly known as "outside diameter").*—The largest diameter of the thread of the screw or nut. The term "major diameter" replaces the term "outside diameter" as applied to the thread of a screw and also the term "full diameter" as applied to the thread of a nut.

*Minor diameter (formerly known as "core diameter").*—The smallest diameter of the thread of the screw or nut. The term "minor diameter" replaces the term "core diameter" as applied to the thread of a screw and also the term "inside diameter" as applied to the thread of a nut.

*Pitch diameter.*—On a straight screw thread, the diameter of an imaginary cylinder, the surface of which would pass through the threads at such points as to make equal the width of the threads and the width of the spaces cut by the surface of the cylinder.

*Pitch.*—The distance from a point on a screw thread to a corresponding point on the next thread measured parallel to the axis.

*Lead.*—The distance a screw thread advances axially in one turn. On a single-thread screw, the lead and pitch are identical; on a double-thread screw the lead is twice the pitch; on a triple-thread screw, the lead is three times the pitch, etc.

The standard screw threads forms are as follows:

American National Screw Thread (formerly U. S. Standard Screw Thread).

French and International System Standard Screw Thread.

Whitworth Standard Screw Thread.

If the angle of the thread in the various screw thread forms is correct and the thread is cut to the correct depth it will fit the nut perfectly. However, if the angle of the thread is incorrect or the lead is incorrect, the thread may appear to fit the nut but will not assemble without damage to both the bolt and the nut.

Details of construction and arrangement of parts will be apparent as the description proceeds, reference now being had to the figures of the accompanying drawing forming a part of this application, and wherein like reference numerals indicate like parts.

In the drawing—

Figure 1:
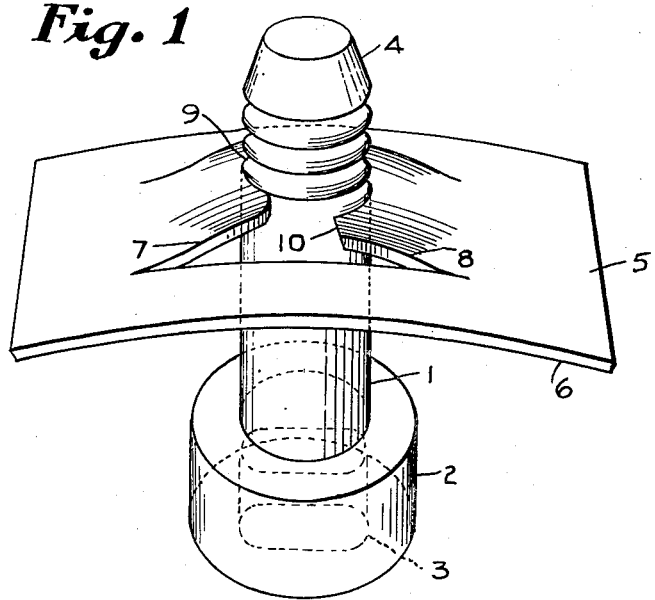
Figure 1 is a perspective view of the bolt and nut in assembled relationship.
Figure 2:
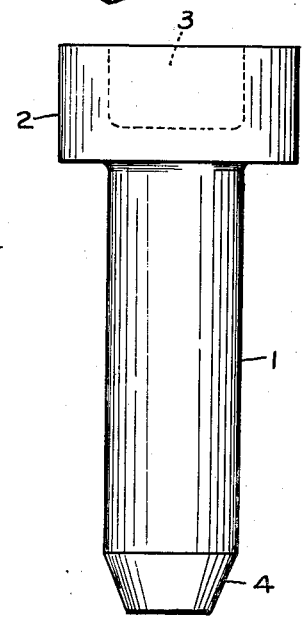
Figure 2 is a view showing the bolt in side elevation.

Referring to the drawing 1 designates a plastic bolt having a head 2 provided with a transverse centrally disposed recess 3 therein adapted for the reception of a screw-driver bit or the like, and a tapering end portion 4 provided thereon so that the bolt may be quickly and easily entered into the nut. The bolt shown in Figure 1 illustrates a thread being cut by the nut as the bolt is screwed thereinto.

The nut 5 is made of spring steel, and may be of rectilinear configuration having an arc therein as at 6. In the nut there provided prongs 7 and 8 so formed and positioned therein in the manufacturing operation, that they portray an interrupted helix so that when the bolt is screwed thereinto, a spiral is cut therein.

Figure 3:
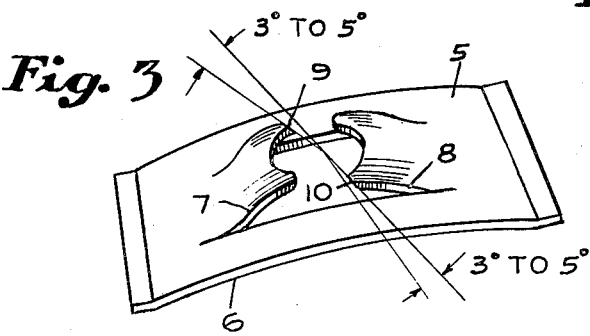
Figure 3 is a perspective view of the nut on a reduced scale and slightly modified.
Figure 4:
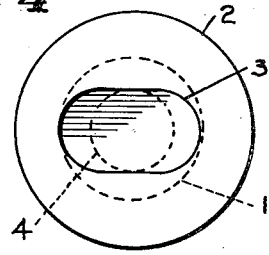
Figure 4 is a top plan view of Figure 2.

The cutting angles of the nut are shown at 9 and 10 and are of acute angle configuration having a back rake from the cutting edge of about 3° to 5° to facilitate free cutting of the plastic bolt. See cutting angles in Fig. 3.

It will be noted that the thread cut by the nut, in the true sense of the term thread, is not a true thread as called for under the respective screw threads formula, but where the specification does not call for machined threads, and maximum production is desired, the bolt and nut will serve the purpose well.

The locking action of the nut on the bolt is as follows: As the bolt is tightened in the nut, the arc in the nut is flattened out causing the prongs in the nut to move closer together producing a smaller minor diameter because the plastic is softer than the steel out of which the nut is made, and at the same time the prongs are pulled down by the compression of the arc creating a new pitch and lead, with the result a double locking action is produced.

While I have herein shown and described a preferred arrangement, it will be readily understood that changes and modifications therein may be found desirable or essential in meeting the various exigencies of use, and I desire to be understood as reserving the right to make any and all such changes or modifications as may be found desirable or essential, in so far as the same may fall within the spirit and scope of the invention as expressed in the accompanying claim when broadly construed.

Having thus described my invention, what I claim is:

A spring nut of the type described comprising a concavo-convex member of right-angled configuration, integral aligned longitudinally extending tongues therein upstruck from the convex surface thereof, the confronting free end portions of the aforesaid tongues being helically twisted and spaced apart to provide a centrally disposed entrance for a plastic bolt to enter therebetween, the leading edges of the aforementioned free end portions of the tongues being provided with a cutting edge having a back rake of substantially three degrees adapted to cut a thread of changing pitch on the plastic bolt when turned therein in the progressive tightening operation which changes the longitudinal curvature of the nut.

NOEL S. SODDERS.

REFERENCES CITED

The following references are of record in the file of this patent:

UNITED STATES PATENTS

| Number | Name | Date |
|---|---|---|
| 561,913 | Paquette | June 9, 1896 |
| 2,007,011 | Tinnerman | July 2, 1935 |
| 2,221,498 | Tinnerman | Nov. 12, 1940 |